(12) United States Patent
Worczinski

(10) Patent No.: US 7,302,958 B2
(45) Date of Patent: Dec. 4, 2007

(54) METHOD AND DEVICE FOR OPERATING TANK FARM SYSTEMS WHICH ARE INTERCONNECTED WITH PIPES IN A FIXED MANNER AND WHICH HAVE PIPE SYSTEMS FOR LIQUIDS

(75) Inventor: Günter Worczinski, Buchen (DE)

(73) Assignee: Tuchenhagen GmbH, Buchen (DE)

( * ) Notice: Subject to any disclaimer, the term of this patent is extended or adjusted under 35 U.S.C. 154(b) by 853 days.

(21) Appl. No.: 10/467,757

(22) PCT Filed: Jan. 17, 2002

(86) PCT No.: PCT/EP02/00432

§ 371 (c)(1),
(2), (4) Date: Aug. 13, 2003

(87) PCT Pub. No.: WO02/066593

PCT Pub. Date: Aug. 29, 2002

(65) Prior Publication Data

US 2004/0123902 A1 Jul. 1, 2004

(30) Foreign Application Priority Data

Feb. 21, 2001 (DE) ................................ 101 08 259

(51) Int. Cl.
*F17D 1/00* (2006.01)
(52) U.S. Cl. .................. 137/1; 137/255; 137/266; 137/312
(58) Field of Classification Search .............. 137/266, 137/267, 255, 1, 312
See application file for complete search history.

(56) References Cited

U.S. PATENT DOCUMENTS

| 3,120,326 | A | * | 2/1964 | Hedeman | 137/266 |
|---|---|---|---|---|---|
| 4,074,687 | A | * | 2/1978 | Joyce | 137/266 |
| 4,344,453 | A | | 8/1982 | Tuchenhagen et al. | 137/240 |
| 4,710,355 | A | | 12/1987 | Ushikubo | 422/100 |
| 4,730,651 | A | | 3/1988 | Millet | 141/236 |

(Continued)

FOREIGN PATENT DOCUMENTS

DE    2229978    1/1974

(Continued)

OTHER PUBLICATIONS

Tuchenhagen Factory of Engineers Journal, 1993.

*Primary Examiner*—Kevin Lee
(74) *Attorney, Agent, or Firm*—Vidas, Arrett & Steinkraus, P.A.

(57) ABSTRACT

The invention relates to a method for operating tank farm systems, which are interconnected with pipes in a fixed manner and which have pipe systems for liquids, particularly for use in systems which are subject to high microbiological quality requirements and which are used for processing and transferring products in the foodstuffs and beverage industry, pharmaceutical industry, and biotech industry. The invention provides that the supply and discharge of liquids into and out of the respective tank ensues from underneath, and that the liquids that are being supplied or discharged flow through a space which is directly connected to the respective tank contents and which is situated underneath the respective tank in a switchable manner, and in a manner that ensures mixing, from the pipes of the pipe system that lead to this space.

16 Claims, 6 Drawing Sheets

U.S. PATENT DOCUMENTS 5,085,241 A    2/1992   Mieth ............................. 137/1
6,314,978 B1 * 11/2001  Lanning et al. ............. 137/266

FOREIGN PATENT DOCUMENTS

| | | |
|---|---|---|
| DE | 7702634 | 2/1979 |
| DE | 3516128 | 11/1986 |
| DE | 3701027 | 7/1988 |
| DE | 298 21 813 U1 | 3/1999 |
| GB | 2077759 | 12/1981 |

* cited by examiner

METHOD AND DEVICE FOR OPERATING TANK FARM SYSTEMS WHICH ARE INTERCONNECTED WITH PIPES IN A FIXED MANNER AND WHICH HAVE PIPE SYSTEMS FOR LIQUIDS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to a method and device for operating tank farm systems in a fixedly piped interconnection with piping systems for liquids, particularly for use in plants subjected to high microbiological quality requirements for product treatment and for product transfer in the foodstuff and beverage industries, pharmacy, and biotechnology.

The microbiological requirements which are made nowadays to production plants in the field of the foodstuff and beverage industries, pharmacy, and biotechnology grow to the extent at which measuring procedures to establish microbiological loads are improved and the limits of detectability are reduced for substances of any types. As a typical example, which is also vicarious for other applications, the document quotes fermentation processes below (e.g. the fermentation sector in brewhouses). Problems will occur here when the setup and arrangement of piping between fermentation tanks and their peripheries, in an interaction with production flows, cause situations which create an environment that encourages the growth of germs. The piping concepts employed nowadays in this sector in conjunction with a tank farm system involve relevant hazard potentials which should be taken into account and should be eliminated, if possible, already in devising such plant concepts. The piping concepts which are favored nowadays are briefly set forth below and indications are made to show where actions are indispensable, taking into consideration the steadily rising microbiological quality requirements.

The relevant art which probably is the most widespread one in the aforementioned sector will be depicted below by the example of a tank farm system 1 (FIG. 1) of a brewhouse that comprises five fermentation tanks 1.1 to 1.n. Their number may be readily extended, for which reason the fifth tank is designated as 1.n. Each of the tanks 1.1 to 1.n is joined to a first filling pipe line 2.1 (a so-called functional line) for filling F1 (wort WZ) and a second filling pipe line 2.2 for filling F2 (yeast H), an emptying pipe line 3 for emptying E1 (new beer J) or for emptying E2 (yeast expulsion H*), a cleaning pipe line 4 for tank/pipe cleaning R1 (cleansing agent R), and a pipe cleaning 12 discharge line for pipe cleaning R2 (cleansing agent R). The junctions at which incompatible media could oppose each other (product P in general, representing wort WZ or yeast H or new beer J, for example, and a cleansing agent R each) are fitted with so-called mix-proof valves. In the present example, this is a second valve 7.2.1.1 to 7.2.1.n which each separates a tank discharge line 8.1.1\* to 8.1.n\*, in which the respective tank volume is for the tanks 1.1 to 1.n, from a respective discharge line 8.1.1 to 8.1.n that leads to a so-called valve block VB. The embodiment of FIG. 1 represents a technically improved piping version already; simpler versions will be briefly outlined below.

The simplest piping system, which is not shown, is to combine the functions of filling F1, F2, emptying E1, E2, and tank and pipe leaning R1, R2 in the central valve block VB and to lead the tank discharge lines 8.1.1\* to 8.1.n\* to this valve block VB in different lengths without intercalating the aforementioned second valves 7.2.1.1 to 7.2.1.n. Although such an arrangement will result in a relatively short traverse distance $a_1$ between so-called traverses 9.1.1 to 9.1.n+1 of the valve block VB, but also a relatively long tank discharge line 8.1.1\* to 8.1.n\*, at least in part, from the individual tank 1.1 to 1.n. In such a manner of installation, the tank discharge line 8.1.1\* to 8.1.n\* and the traverse 9.1.1 to 9.1.n each associated therewith of the valve block VB form part of the respective tank 1.1 to 1.n. Here, the drawback is that the tank volume in the respective tank 1.1 to 1.n inevitably is also the contents each of the tank discharge line 8.1.1\* to 8.1.n\* associated therewith and the traverse 9.1.1 to 9.1.n which joins it, and that this portion takes part in the treatment process (the fermentation process, in this embodiment) in the tank 1.1 to 1.n only to a very limited degree because of the geometry and arrangement conditions, which also results only in a restricted exchange of substance there.

The foregoing drawbacks can be mitigated somewhat if the tank discharge lines 8.1.1\* to 8.1.n\* are laid at a slope as large as possible to the valve block VB. As a result, a certain convection and, thus, a stirring action which favors the exchange of substances will arise because of the gas bubbles rising up to the respective tank 1.1 to 1.n within each associated tank discharge line 8.1.1\* to 8.1.n\*.

However, the main problem encountered for the tank 1.1 to 1.n fixedly piped to the valve block VB, that cannot be disconnected in each case in its tank discharge line 8.1.1\* to 8.1.n\* leading to the valve block VB, substantially is that is it impossible to provide for an expulsion of the product P and a separate cleaning R1 of the tank discharge lines 8.1.1\* to 8.1.n\* and the associated traverses 9.1.1 to 9.1.n.

In such an arrangement, for example, if the tank 1.2 is filled with wort WZ the end of the filling line (the first filling pipe line 2.1 here) between the valves $V_{12}$ and $V_{16}$ of the valve block VB and the end of the traverse 9.1.2 between the valve $V_{12}$ and a valve $V_{52}$ will be filled as well. Those line volumes virtually would not allow to be expelled and wound not even if a so-called expulsion device A1 extending from a expulsion pipe line 6 was passed into the tank, which is tank 1.2 in the present case. As a result, there is a non-definable mix in the traverse 9.1.2 that consists of wort WZ, possibly yeast H if yeast was metered after wort had been added, and expulsion water. This mix will remain there until the tank 1.2 is emptied and cleaned again after a few days.

From brewhouse technological interconnections, it has been known, and cannot be ruled out either, that the wort WZ contains germs which cannot be found to exist as long as they are suppressed by an active outer field of the yeast H. Such slumbering germs, however, begin to multiply as soon as favorable conditions arise for a relevant propagation. For example, such conditions are created by the fact that the mix of wort WZ, yeast H, and expulsion water W, which is in the respective traverse 9.1.1 to 9.1.n, will heat up because of the hot cleaning (at 85 to 90° C.) of the functional lines that takes place every day. Temperatures up to 35° C. will then be readily achieved there so that this creates optimal conditions for germ multiplication depending on the germ strain, all the more so as the yeast H, after reaching the final fermentation level, is no longer active and will settle. As a result, the yeast stops its germicidal performance. The germs which thus multiply without any control and virtually cannot be reached are entrained into other tanks and production areas be-cause of the emptying, yeast extraction, and repumping operations that succeed, and will be a burden on the product.

The version illustrated in FIG. 1, which is technically improved as compared to the foregoing, simpler piping version, allows to subject a portion of the discharge line 8.1.1 to 8.1.n** and the respective discharge line 8.1.1 to 8.1.n which joins it to separate pipe cleaning R1 via a tank cleaning feed line 11.1.1 to 11.1.n irrespective of a cleaning of the respective tanks 1.1 to 1.n. This is always accomplished via a first valve 7.1.1.1 to 7.1.1.n and the second valve 7.2.1.1 to 7.2.1.n of which the first one separates the first portion of the discharge line 8.1.1* to 8.1.n* from the cleaning pipe line 4 and the second one which separates this portion from each succeeding discharge line 8.1.1 to 8.1.n, which separate the respective associated tank discharge line 8.1.1* to 8.1.n* from the mentioned discharge lines 8.1.1** to 8.1.n****.

When the plant periphery is configured accordingly and the time-scheduled production flow schema allow to do so this pipe cleaning R1 can be carried out traverse by traverse after each filling and emptying operation or once a day by fully clocking all discharge lines 8.1.1 to 8.1.n along with the traverses 9.1.1 to 9.1.n in each cleaning phase of the tank and pipe line system.

For example, the cleaning procedure for the traverse 9.1.3 is as follows:

The cleansing agent R is fed to the site through the cleaning pipe line 4 in the path of the pipe cleaning R1. It passes into the portion of the discharge line 8.1.3* via the first valve 7.1.1.3 and, thence, into the discharge line 8.1.3 via the second valve 7.2.1.3 and, finally, flows into the traverse 9.1.3 in order to get into the line 4 from this point through the valve $V_{53}$ of the valve block VB and to leave the illustrated piping system subsequently via a second pump 14.

The lines 10.1 to 10.3 which cross the traverses 9.1.1 to 9.1.n+1 are adapted to be cleaned via pipe cleaning devices R2 which are acted on by the supply of cleansing agent R via a second pipe cleaning feed line 5.2 and optionally by an actuation of valves which are not referred to in detail. During this pipe cleaning R2, the cleansing agent exits the piping system through the pipe cleaning discharge line 12. A lock-up valve 15 allows to effect the tank and traverse cleaning R1 via the cleaning pipe line 4 with no need for this line between the tank 1.1 and the second pump 14 to be flown through by the cleansing agent R as well.

The cleaning of the fourth line 10.4 (pipe cleaning R2) which opens out into the discharge pipe line 3 through a first pump 13 is effected by admitting a cleansing agent R through a first pipe cleaning feed line 5.1. On its route into the fourth line 10.4, the cleansing agent R initially passes through a second valve $V_{401}$ preceding the valve matrix and, subsequently, through a preceding first valve $V_{40}$.

What can be deduced from the foregoing concise instructions for cleaning the piping and tank farm system is that an arrangement of a multiplicity of valves and additional pipe line portion permits to clean substantially all areas of the interconnected piping system.

However, the piping system of a known type illustrated in FIG. 1 also results in regions of non-expelled product within the valve block VB. A non-expelled product P will be washed out during the cleaning which follows and, hence, constitutes a loss of product via the first filling pipe line. Referring to the aforementioned filling of the tank 1.2 with wort WZ via the first filling pipe line 2.1, a brief indication is to show what the mentioned loss of product is in this definite case. If expulsion water W is introduced in the path of the expulsion device A1 via the expulsion pipe line 6 it is possible to expel that wort WZ, which has built up in the discharge lines 8.1.2* and 8.1.2 and in the traverse 9.1.2 which joins it and accumulates up to a valve $V_{42}$, into the tank 1.2. The volume contained in the traverse 9.1.2 in the region between valves $V_{42}$ and $V_{52}$ as well as the volume contained in the pipe line 10.1 in the area between V12 and V16 cannot be captured through the aforementioned expulsion device A1 via the expulsion pipe line 6. Thus, the wort WZ is lost in those pipe line areas.

This loss in the aforementioned line portions which are in communication with the first filling pipe line 2.1 can admittedly be diminished by extra installation expenditure which makes possible a so-called "counter-expulsion". However, such a measure mostly is worthwhile only for very long lines within the valve block VB.

In addition, further measures are known which are apt to further reduce the loss of product. One of such measures consists in expelling the product from the lines in question by means of a so-called "pipe circuit expulsion", which does not produce any appreciable "dead ends" in the piping system. In any case, the "counter-expulsion" or "pipe circuit expulsion" will necessitate a significant installation expenditure. Such solutions involve that the traverses of the valve block VB and the discharge lines leading away from the tanks are always cleaned in a pure cleaning procedure which is independent on tank cleaning. To avoid restrictions in time because the discharge line is occupied by tank cleaning the tank cleaning return line is directly connected to the tank and does not use the discharge line.

The assembly to realize the aforementioned "pipe circuit expulsion" is subjected to certain restrictions because the pipe circuit on the valve block VB can presently be used for one cleaning operation only. Restrictions can only be avoided by a well-timed production management or by the installation of a further pipe circuit.

As a conclusion, let us give a summary of the essential drawbacks which are inherent to all tank farm systems which work in a fixedly piped interconnection with valve blocks VB in which a multiplicity of valves are disposed in the form of a matrix:

The branching points of such valves are followed by pipe line portions from which the product P usually cannot be expelled (example: a portion of the discharge line 8.1.2; a portion of the first line 10.1 adjacent to $V_{12}$ to $V_{16}$; the traverse 9.1.2** adjacent to $V_{42}$ to $V_{52}$).

A non-defined mix of various products P (WZ, H, J) and expulsion water W will often form in the so-called "dead ends".

The non-expelled product P will turn into a loss during the succeeding cleaning procedure at the latest.

Non-defined product mixes cause negative burdens on the desired product P that depend on their compositions, because non-controlled processes might run. Such processes can lead to an undesirable growth of germs.

Increases in temperature, e.g. as a result of hot cleaning operations, cause an environment in the traverses of the valve block that encourages an undesirable growth of germs.

Specifically in horizontally disposed valve blocks and in case of long lines, the product P contained therein is not involved in the treatment process in the tank. Thus, no exchange of substance or merely a low exchange will take place in the pipe line portions in question.

Avoiding areas of a non-expelled product P in the classical valve matrixes discussed above, diminishing losses of product, and allowing those areas to be separately cleaned even if the tank is full requires a very large expenditure in the periphery of the valve matrix that cannot be realized in most cases for reasons of economy and leads to difficult-to-survey piping systems which necessitate a lot of maintenance. For these reasons, when the problems are tackled in practice, compromising solutions are found that exhibit more or less pronounced restrictions.

The air which has entered the tank discharge line and the discharge line joining it in conjunction with the traverse during tank cleaning prevents the piping system from being properly cleaned.

BRIEF SUMMARY OF THE INVENTION

It is the object of the invention to provide a method for operating tank farm systems in a fixedly piped interconnection with piping systems for liquids, which poses high microbiological quality requirements and enables the device for its implementation to be configured easier than are comparable known devices.

The inventive idea reflects itself in a tank farm system comprising at least one tank to which liquids are fed from the piping system, in which liquids from the tank are discharged into the piping system, and in which the supply of the liquids into and the delivery of the liquids from the respective tank is effected from bottom. The crux of the invention is that the liquids to be fed or discharged flow through a space in a direct communication with the respective tank volume below the respective tank and that the liquid concerned in this space is separable optionally, switchably and in a mix-proof manner from the pipelines of said piping system led to said space, in a direct vicinity of its inner bordering.

The feed of all functional lines directly to a space below the respective tank that is in a direct communication with the tank volume avoids all of the drawbacks mentioned in connection with the state of the art. Line ends containing non-expelled substance will not be formed in a discharge line leading away from the tank. The pipe lines which are separable optionally, switchably and in a mix-proof manner from the space in a direct vicinity of its inner bordering may be expelled into the tank by means of counter-expulsion so as to reduce the losses of product to a minimum or avoid them completely. The liquid in the space is in a vivid exchange of substance with the tank volume; so that non-controlled processes cannot run there. A significant heat-up of the liquid disposed in the space below the tank because of hot cleaning of the functional lines connected to this space does not take place because the vivid exchange of substance existing between the tank volume and the volume of the space provides for a dissipation of the heat that is possibly produced.

The process, if implemented, presupposes a tank farm system which comprises at least one tank in an interconnection with a piping system comprising at least one pipe line. Features of the device which are substantial to the invention are a valve manifold tree each opening out in the lower tank bottom of the respective tank which preferably is formed as an elongate hollow body that is oriented substantially perpendicular, and has connection apertures for joining its interior to each of the pipe lines, and a valve configured to be mix-proof in its respective seat area that is disposed in each connection between the pipe line and the connection aperture associated therewith and switches this connection in a close vicinity of the hollow body.

The elongate hollow body quasi functions as an extremely short tank discharge line. It enables the pipe lines connected thereto to be optionally and switchably disconnected by appropriate valves configured to be mix-proof in a direct vicinity of its inner bordering. This does not form any line ends with non-expelled products. The product from the pipe line length facing away from the junction point behind the respective valve may be shifted into the hollow body and, hence, into the tank joining it directly, by means of a "counter-expulsion". The proposed assembly saves space, is cost-effective, is easily surveyed, and requires little maintenance. Its low installation expenditure and easy-to-survey arrangement makes the proposed device less susceptible to defects.

Since the bottom of the respective tank is tapered downwards, as a rule, the hollow body is disposed at the lowest point of the respective tank bottom. If the tank bottom shape is designed to be axially symmetrical to the longitudinal axis of the tank, which is the case for most tank shapes applied in practice, the longitudinal axis of the hollow body is disposed coaxially with the longitudinal axis of the tank. The design of the hollow body proves to be particularly simple if it is configured as a cylindrical tube as is continually proposed.

The hollow body can be completely emptied and smoothly cleaned when its lowermost end facing away from the tank bottom is joined to a cleaning pipe line.

The pipe line path of the piping system for a plurality of tanks will become particularly simple and easily surveyable if as a first proposal provides a first set of pipe lines and a second set of pipe lines are arranged by pairs each in a respective row-shaped relationship amongst each other on opposed sides of the hollow body in two planes parallel to each other and to the longitudinal axis of the hollow body and are led past said hollow body. An arrangement of this type will be beneficial whenever the tanks are disposed by rows.

If a case occurs where the tanks are disposed in the form of a rectangular matrix, for example, another proposal provides that the first set of pipe lines and the second set of pipe lines are disposed by pairs each amongst each other on opposed sides of the hollow body in planes parallel to each other and to the longitudinal axis of the hollow body and, while crossing each other at an angle of 90 degrees, are led past the hollow body. This arrangement makes it possible to pipe a tank in an interconnection within a valve matrix comprising a multiplicity of tanks in both one direction of arrangement and another direction oriented perpendicular thereto in a regular case, extending from the inventive hollow body.

The piping system becomes particularly easy-to-survey and simple, according to another proposal, if the pipe lines are designed each as continuous pipe lines associated with all tanks of a tank system in the same function (filling F; emptying E; tank/pipe cleaning R1, R2).

The optional, switchable, and mix-proof disconnection of the respective pipe line from the hollow body, according to a first embodiment, is effected by a so-called double seat valve as has been known, for example, from U.S. Pat. No. 4,436,106 or DE-U-77 02 634. This double seat valve has two closing members which are movable relative to each other and define a co-called leakage cavity between them that is joined to the area surrounding the double seat valve via at least one communication path. This configuration makes the valve proof against mixes so that if a defect occurs at one of the two seat seals the respective liquid admittedly flows into the leakage cavity and, thence, into the area surrounding the double seat valve, but is unable to build up a pressure in the leakage cavity and, as a consequence, may get into the valve casing portion closed by the other closing member.

A second embodiment of a double seat valve as is described in DE-C-37 01 027 provides a closing member formed like a slide valve and displaceable in a translatory motion which, in combination with the valve casing, realizes two sealing points. Those sealing points are disposed serially and in planes parallel to each other. The valve has a leakage cavity disposed on the valve casing end that is joined to the area surrounding the valve, on one side, and opens out into an interior of the valve between the sealing points, on the other, and is closed by the closing member interacting with the two sealing points when the valve is in the closing position with respect to the interior. The peculiarity of the valve further is that the entry of a medium into the leakage cavity from the interior, in positions other than the closing position of the valve, is controlled in its action in the same way as in the closing position by means of an apparatus substituting for the closing member with regard to its interaction with the leakage cavity. The apparatus concerned is preferably an annular closure element with a passage therein that is of the respective shape and dimensions of the closing member with respect to the sealing points and is disposed relatively movably towards the closing member in the direction of the freedom degree of motion thereof. This double seat valve can be designed to be switchable with no leakage, the two sealing points can be realized by two discrete seals disposed on the valve casing, and the leakage cavity can be joined to the area surrounding the valve in a very simple manner and can be sized in space very generously, if required. The valve is of a relatively simple structure and the seat area may be led up to the interior of the manifold tree at an extremely short distance.

A third embodiment provides that the respective pipe line be blocked from the interior of the hollow body via a so-called double-action sealing valve. Such a double-action sealing valve, as far as the design is concerned in its seat area, is fitted with a single closing member which has two seat seals spaced apart in the direction of lift between which an annularly circumferential leakage cavity is disposed which is joined to the area surrounding the double seat valve via at least one communication path. This double-action sealing valve is mix-proof as well because also here if a sealing defect occurs on one of the two seat seals the liquid getting into the leakage cavity through this sealing point will be diverted into the area surrounding the double-action sealing valve and cannot build up on the other seal under a pressure or possibly penetrate into the adjoining valve casing portion (DE-C-35 16 128).

According to a further proposal, the drive of the two aforementioned mix-proof valve types (U.S. Pat. No. 4,436, 106 and DE-U-77 02 634 or DE-C-37 01 027; DE-C-35 16 128) is given a design such as to enable them to be subjected to a seat cleaning via partial lifting motions of their respective closing members (first-type or second-type double seat valves) or its one closing member (DE-C-35 16 128). This makes it possible to subject the mix-proof valves of the aforementioned type disposed on the inventive manifold tree not only to a cleaning of their leakage cavity in both the closing and opening positions (double seat valve) or a cleaning of the leakage cavity that is limited to the closing position (double-action sealing valve), but also to a seat cleaning of the one sealing point if the respective other sealing point remains in the closing position. Thus, the proposed device allows to carry out all of the currently common valve cleaning procedures in the seat area of the valve as are also common for conventional valve blocks having the aforementioned double seat and double-action sealing valves.

Finally, a separation of the pipe line concerned from the inventive hollow body may also be effected via a so-called disc valve which is formed with two seals spaced apart from the sealing circumference of the disc-shaped closing member between which an annularly circumferential leakage cavity is disposed which is joined to the area surrounding the disc valve via at least one communication path. The fundamental design of such a disc valve configured to be mix-proof is known from DE-A-22 29 978, for example. A disc valve of this type allows to clean the leakage cavity in the closing position.

To avoid losses of product to a very large extent in the inventive device, another proposal provides that a valve assembly, which is known per sé, be provided at each near-the-tank end of the pipe lines disposed on the hollow body, for an expulsion of product from the pipe lines.

BRIEF DESCRIPTION OF DRAWINGS

Embodiments of the device for implementing the method of the invention are illustrated in FIG. 2 to FIG. 6 and will be described below with regard to their construction and function. In the drawings:

FIG. 4a in the form of a section, shows a schematic representation of a further embodiment of the valve assembly of FIG. 4 for the expulsion of a product from the pipe lines in the region of the last tank where the double-action sealing valves employed in this region match those in the region of the valve manifold trees;

FIG. 5a in the form of a section, shows a schematic representation of a further embodiment of the valve assembly, which is modified with respect to the assembly of FIG. 5, for an expulsion from the pipe lines in the region of the last tank where the double seat valves employed in this region match those in the region of the valve manifold trees.

DETAILED DESCRIPTION OF THE INVENTION

Figure 2:
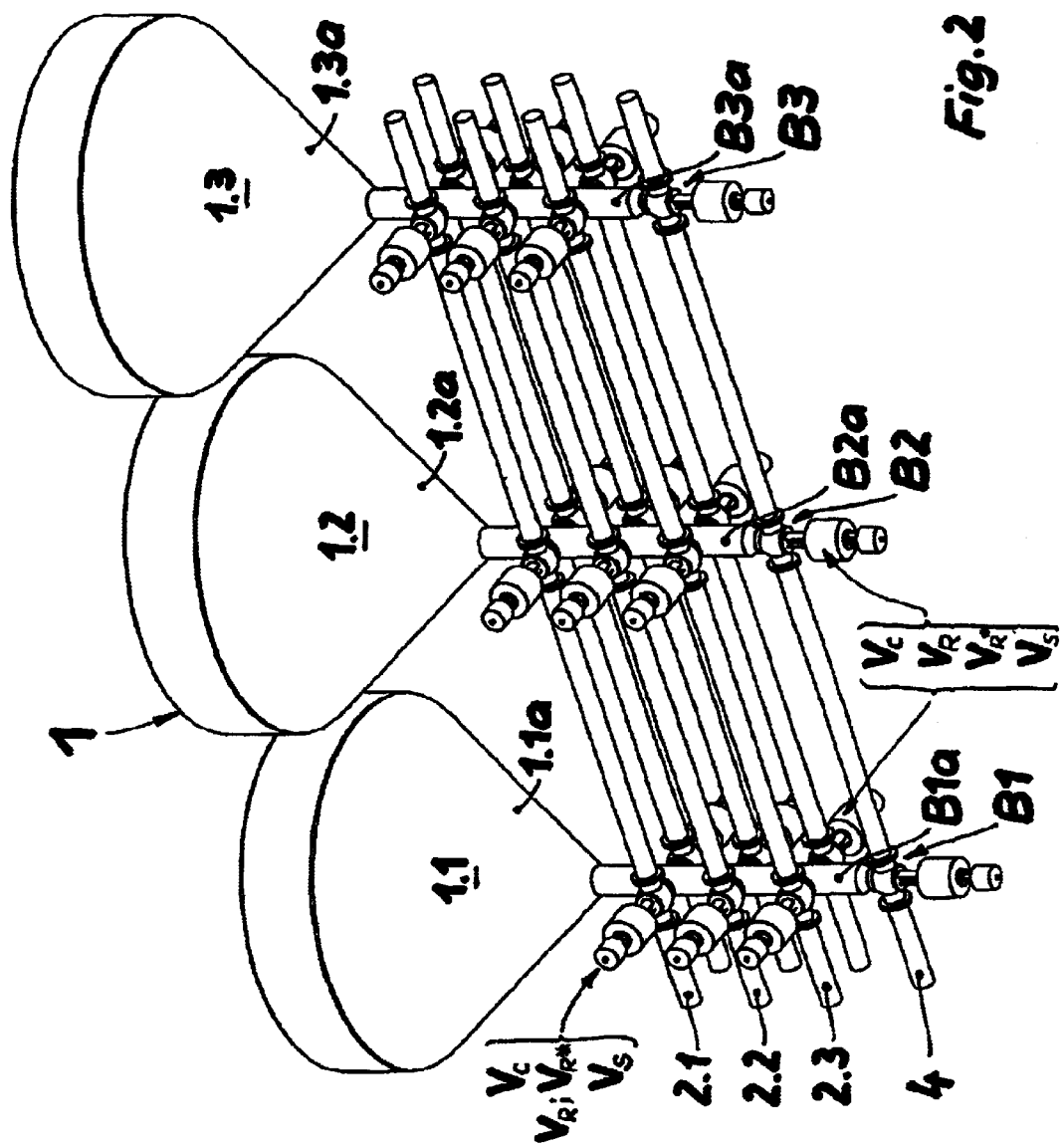
FIG. 2 shows a perspective view of a row-shaped array of three tanks of a tank farm system which are fitted with the inventive device in a preferred embodiment.

While this invention maybe embodied in many different forms, there are described in detail herein a specific preferred embodiment of the invention. This description is an exemplification of the principles of the invention and is not intended to limit the invention to the particular embodiment illustrated FIG. 2 shows a tank farm system 1 which comprises three tanks 1.1, 1.2, and 1.3 in a row-shaped array. Each tank bottom 1.1a, 1.2a, 1.3a of each respective tank 1.1, 1.2, 1.3, at its lower end, opens out into a valve manifold tree B1, B2, B3 which is preferably formed as an elongate hollow body B1a, B2a, B3a in the form of a cylindrical tube. The longitudinal axis of the hollow body B1a, B2a, B3a is oriented perpendicularly and coaxially with the longitudinal axis of the respective tank 1.1 to 1.3. The lowermost end of the respective hollow body B1a to B3a that faces away from the tank bottom 1.1a to 1.3a has disposed thereon a cleaning pipe line 4 which continuously joins all hollow bodies B1a to B3a to each other. A first set of pipe lines in which pipe lines 2.1, 2.2, and 2.3 are disposed in a row-line manner amongst each other and in a plane parallel to the longitudinal axis of the hollow body B1a to B3a are led past the latter one at a distance as short as possible. In the same manner, a second set of pipe lines comprising pipe lines 3.1, 3.2, and 3.3 are disposed on the hollow body B1a to B3a, i.e. in such a way that their plane of arrangement extends in parallel with the plane of arrangement of the first set of pipe lines 2.1, 2.2, 2.3 and on that side of the hollow body B1a to B3a which faces away from the latter set. Here, all of the pipe lines 2.1 to 3.3 are continuously led past the hollow bodies B1a to B3a and are optionally and switchably joined each to the respective interior of the hollow body B1a to B3a via a mix-proof design valve $V_C$, $V_R$, $V_{R*}$ or $V_S$.

Figure 3:
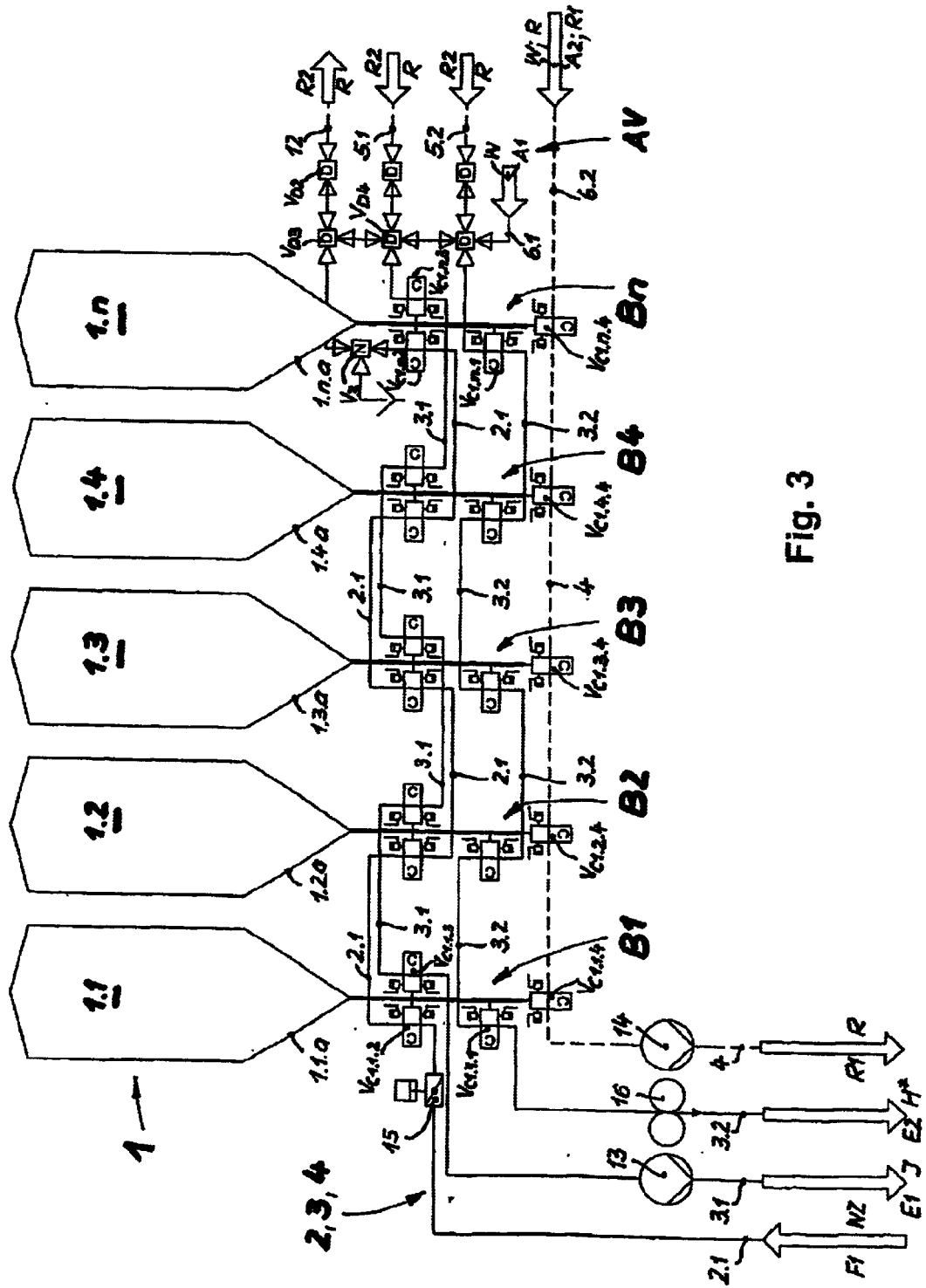
FIG. 3 shows a schematic representation of the array of FIG. 2 including five tanks in a fixedly piped interconnection with four pipe lines (functional lines) where the valves on the respective manifold tree are configured as so-called double-action sealing valves.

The inventive device is further explained in FIG. 3 by means of five tanks which, for example, function as fermentation tanks. The fifth tank following the tanks 1.1 to 1.4 is designated by 1.n here. This general designation is intended to express that the inventive device proposed may also cover a larger number of tanks. In the embodiment, each valve manifold tree B1 to Bn has provided thereon four mix-proof double-action sealing valves $V_C$ (e.g. tank 1.1: $V_{C1.1.1}$, $V_{C1.1.2}$, $V_{C1.1.3}$; $V_{C1.1.4}$) with the double-action sealing valve $V_{C1.1.4}$ to $V_{C1.n.4}$ provided each at the lower end of the valve manifold tree B1 to Bn joining the cleaning pipe line 4 to each of the valve manifold trees B1 to Bn. The cleaning pipe line 4 is supplied with expulsion water W via a second expulsion pipe line 6.2 in the course of a second expulsion device A2 and its other end has located thereon the second pump 14 which carries away the cleansing agent R resulting from tank cleaning R1 and the expulsion water W resulting from the expulsion device A2. The respective tanks 1.1 to 1.n in question are supplied with wort WZ, for example, via the first filling pipe line 2.1 in the course of the first filling F1. For this purpose, the pipe line 2.1 is optionally and switchably joined to the associated valve manifold tree B1 to Bn via a double-action sealing valve $V_{C1.1.2}$ to $V_{C1.n.2}$. The pipe line 2.1 terminates in a valve assembly designated by AV for expulsion from the pipe lines. To this end, the pipe line 2.1 is carried away into the area surrounding the piping system initially via a lock-up valve having three casing connections $V_3$ and, subsequently, via double seat valves $V_{D3}$ and $V_{D4}$ and, the pipe cleaning discharge line 12 joining it. A first emptying procedure E1 is accomplished via a first emptying pipe line 3.1. For example, this may apply to new beer J which is led to the pipe line 3.1 from the respective tank 1.1 to 1.n on a path via the associated valve manifold tree B1 to Bn and the respective double-action sealing valve $V_{C1.1.3}$ to $V_{C1.n.3}$ and is routed away into the following area through the first pump 13. At the other end, the line 3.1 also terminates in the valve assembly AV for an expulsion from the pipe line wherein a double seat valve $V_{D4}$ and, subsequently, a double seat valve $V_{D2}$ (not designated) are provided, in the present case and the latter one can be fed with cleansing agent R via the first pipe cleaning feed line 5.1 for the purpose of pipe cleaning.

Accordingly, the second emptying procedure presents itself in the same way. For example, a withdrawal of yeast H* is concerned here. To this end, a second emptying pipe line 3.2 is provided, with a third pump 16 which may be optionally and switchably be connected to the associated valve manifold tree B1 to Bn via a double-action sealing valve $V_{C1.1.1}$ to $V_{C1.n.1}$ each. Likewise, the pipe line 3.2 terminates in the valve assembly AV on the other side; it is joined, in the present case, via double seat valves VD4 and VD2, to the second pipe cleaning feed line 5.2 to which cleansing agent R may be fed in the case of pipe cleaning 2. For an expulsion A1 from pipe lines 2.1, 3.1, and 3.2, a first expulsion pipe line 6.1 is provided via which expulsion water W may be fed to the piping system.

The inventive device as is represented in FIGS. 2 and 3 provides a gain of space which is not insignificant as compared to devices designed according to the state of the art. For example, brewhouses employ cylinder conical tanks 1.1 to 1.n which usually make their tank bottoms 1.1a to 1.na project through a ceiling or are mounted on a framework so that the inventive device proposed may be smoothly arranged below the tank outlet. The respective tank 1.1 to 1.b including the associated manifold tree B1 to Bn may be completely emptied through the cleaning pipe line 4 which runs at the lower end of the valve manifold trees B1 to Bn and functions as a tank discharge line. If the tank 1.1 to 1.n is filled the valve manifold tree B1 to Bn virtually constitutes a tank bottom extension in which an exchange of substances may take place by convection, on one hand, and in which additionally a heat-up caused by the cleaning of the functional lines 2.1 to 3.3 disposed at the sides of the valve manifold beam B1 to Bn does not occur, on the other. For example, this avoids the germ-multiplying environment in the tank 1.1 to 1.n. Moreover, in a fermentation tank, the point of largest yeast accumulation with its germicidal effect is just located in the lower region of the tank bottom 1.1a to 1.na (tank cone).

Figure 4:
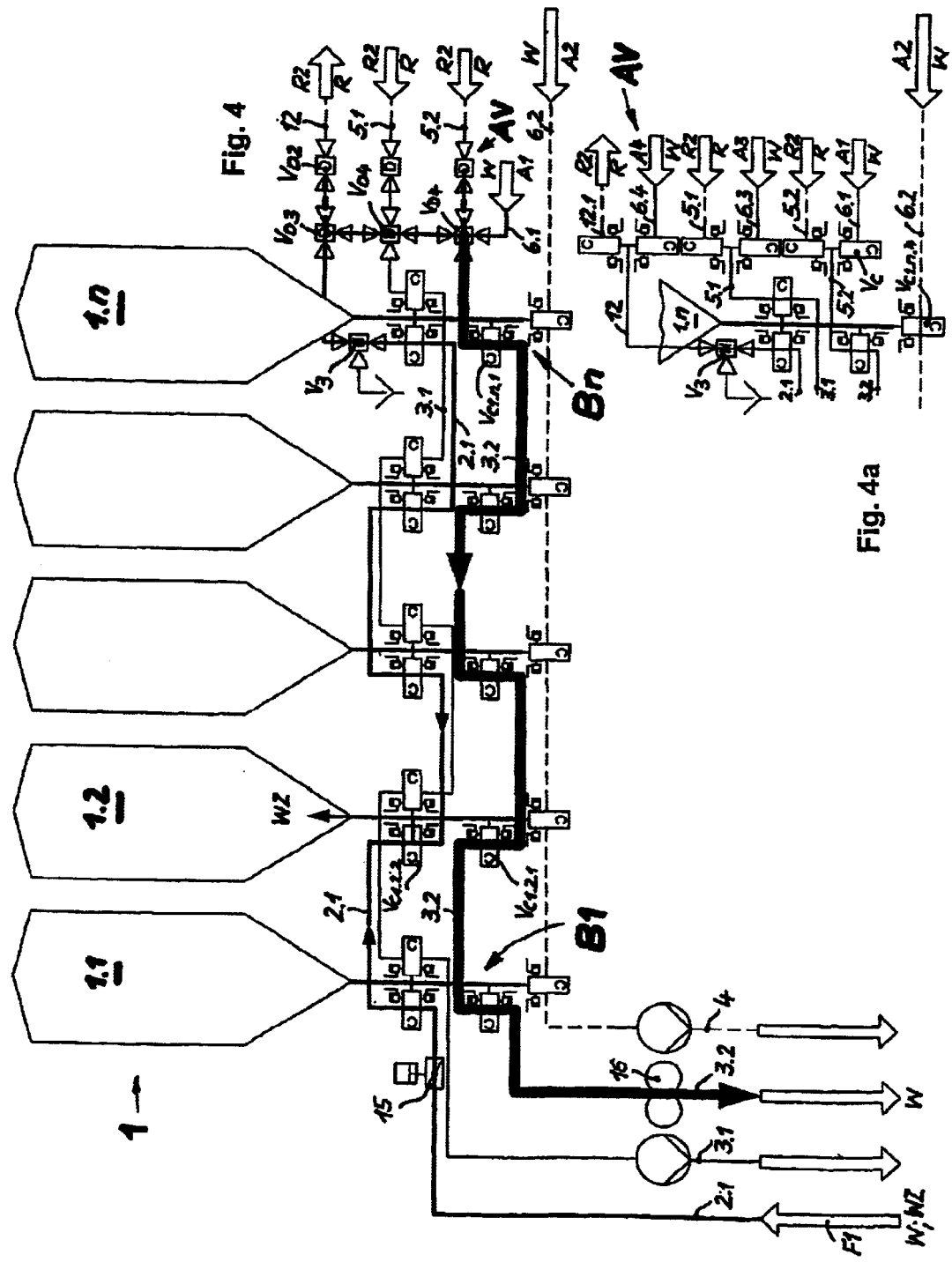
FIG. 4 also in a schematic representation, shows the array of FIG. 3 where the different possible ways of expulsion are illustrated by way of example.

FIG. 4, by way of example, explicates the co-called expulsion management, if product is to be expelled from the second pipe line 3.2 through which yeast H* was withdrawn from one of the tanks 1.1 to 1.n before expulsion water W is fed via the expulsion pipe line 6.1 on a path through the double seat valve $V_{D4}$. The expulsion water W will now displace the yeast H* located in the line 3.2 completely on a path through the third pump 16 until it reaches its destination. It can be realized that no "dead line ends" exist and, consequently, that this will minimize the loss of product as far as this is possible at all.

For example, if the tank 1.2 is intended to be filled with wort WZ via the first filling pipe line 2.1 in the course of the filling procedure F1 the double-action sealing valve $V_{C1.2.2}$ is opened for this purpose. The wort WZ flows to the tank 1.2 while the pipe line 2.1 located downstream of the double-action sealing valve $V_{C1.2.2}$ in the direction of flow will also be filled with wort WZ. This line section may be emptied, subsequent to the filling of the tank 1.2, via a so-called "counter-expulsion" A1, which has its outset in the valve assembly AV because of a supply of expulsion water W via the first expulsion pipe line 6.1. After the lock-up valve 15 is closed the wort WZ contained in the pipe line 2.1 will be expelled to flow into the tank 1.2 with nearly no loss via the double-action sealing valve $V_{C1.2.2}$.

FIG. 4a shows the valve assembly AV for expulsion from the pipe lines if the double-action sealing valves $V_C$ which are used in the area of the valve manifold trees B1 to Bn are employed also there. It can be recognized that each of the pipe lines 2.1, 3.1, and 3.2, on a way via an associated double-action sealing valve $V_C$, terminates in an end portion of the of tank cleaning discharge line 12.1 or the first or second pipe cleaning feed line 5.1, 5.2 for pipe cleaning R2 for the supply and discharge of the cleaning agent R, on one hand, and is joined, on the other, to a fourth or third or first expulsion pipe line 6.4, 6.3, and 6.1, respectively.

Figure 5:
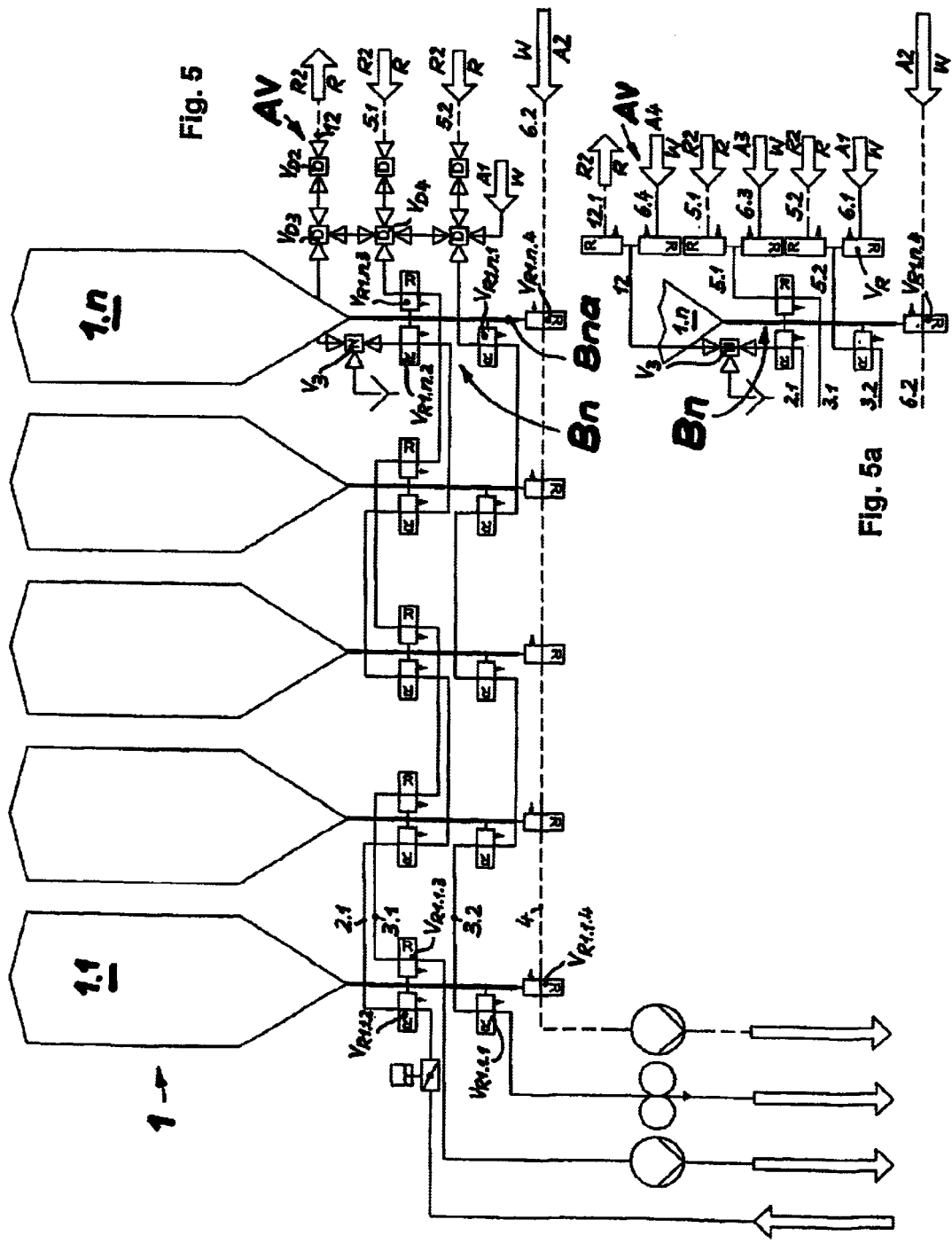
FIG. 5 show a schematic representation of another embodiment of the proposed device of FIG. 3 where the mix-proof valves disposed on the respective valve manifold trees are configured in the form of so-called first-type double seat valves.

FIG. 5 elucidates the inventive device if so-called first-type double seat valves $V_R$ or second-type $V_{R*}$ are employed in lieu of the double-action sealing valves $V_C$ used in FIG. 4. With regard to the designations chosen, the representation merely makes reference to the first-type double seat valve $V_R$. Neither the differences between the two embodiments $V_R$ and $V_{R*}$ nor the differences between the latter ones, on one hand, and the double-action sealing valve $V_C$, on the other, have an impact on the fundamental structure of the inventive device. Differences, if any, only consist in the increased degree of safety that this type of mix-proof valve $V_R$, $V_{R*}$ provides over a double-action sealing valve $V_C$. In addition, the leakage cavity of such double-action sealing valves $V_R$, $V_{R*}$ can be cleaned not only in the closing position, but also the opening position of the valve.

FIG. 5a shows that also the valve assembly AV for expulsion from the pipe lines can be continuously configured with the previously described first-type double seat valves $V_R$ the prototype of which has been known from the U.S. Pat. No. 4,436,106, for example, or that second-type valve $V_{R*}$ the prototype of which is described in DE-C-37 01 027.

Figure 6:
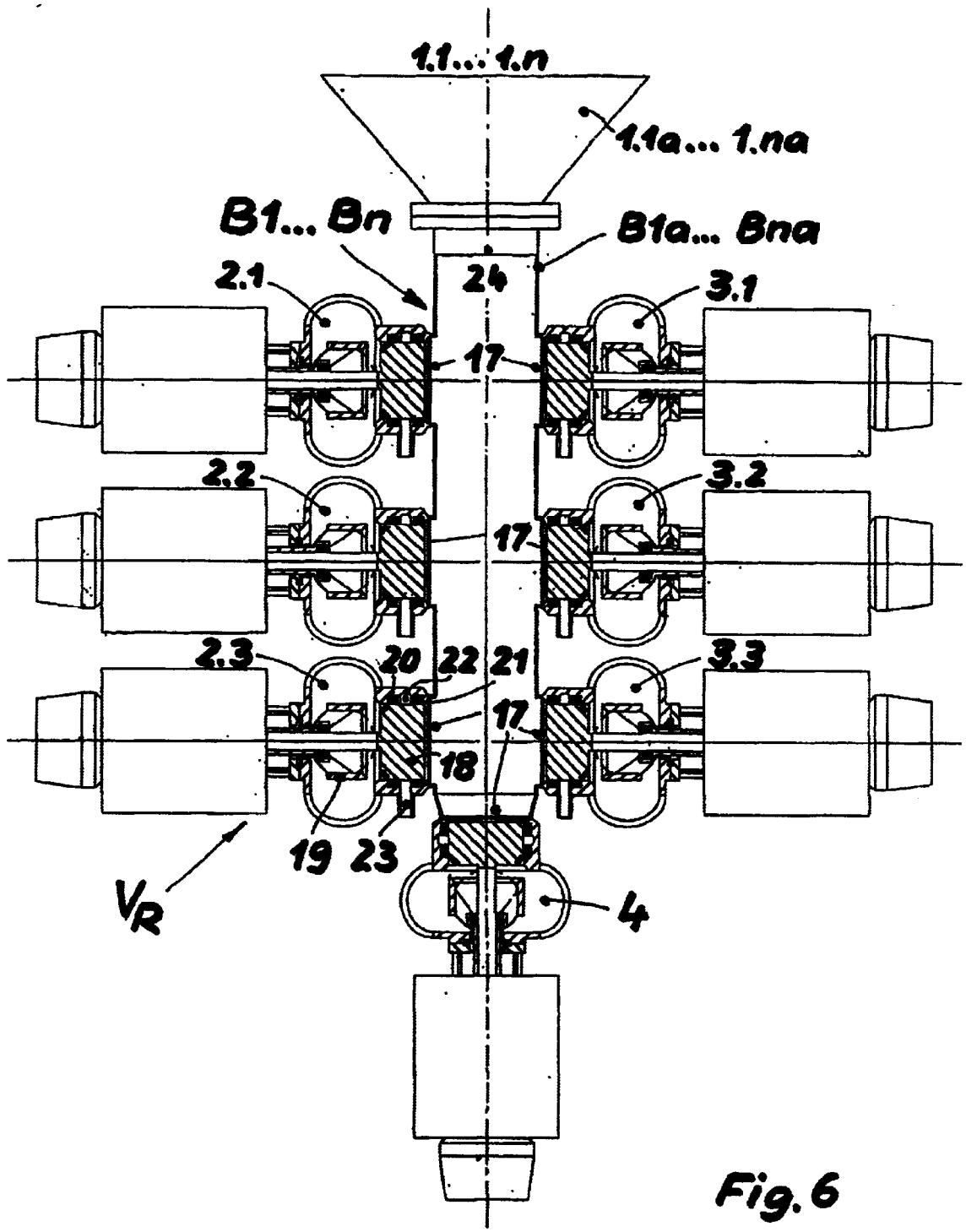
FIG. 6 shows a median section through a manifold tree which is fitted with second-type double seat valves.

A definite configuration of a manifold tree B1 to Bn with second-type double seat valves $V_{R*}$ (DE-C-37 01 027) is shown in FIG. 6. The elongate hollow body B1a to Bna is connected to a tank outlet 24 of the tank bottom 1.1a to 1.na and extends perpendicularly downwards. The hollow body B1a to Bna is branched into the pipe lines 2.1 to 2.3, 3.1 to 3.3 via connections 17 and into the pipe line 4 at the lower end. Each of the connections 17 has disposed thereon a second-type double seat valve $V_{R*}$ which has a slide valve type closing member 18 and a slide valve type closure element with a passage 19 therein. On the valve casing end, first and second sealing points 20 and 21 are provided at a spacing from each other which, when the double seat valve is in the closing position that is shown each, interact with the closing member 18 and, when it is in the opening position, interact with the passage 19 therein. A leakage cavity 22 formed between the sealing points 20, 21 on the valve casing end is joined to the area surrounding the valve to discharge any leaking substances that might arise. It can be seen that the configuration of the double seat valve $V_{R*}$ makes it readily possible, with thee valve in its closing position, to ensure a nearly flush closure of the interior of the hollow body B1a to Bna by the front-end face of the closing member 18 facing the latter.

REFERENCE NUMBERS OF ABBREVIATIONS USED

Figure 1:
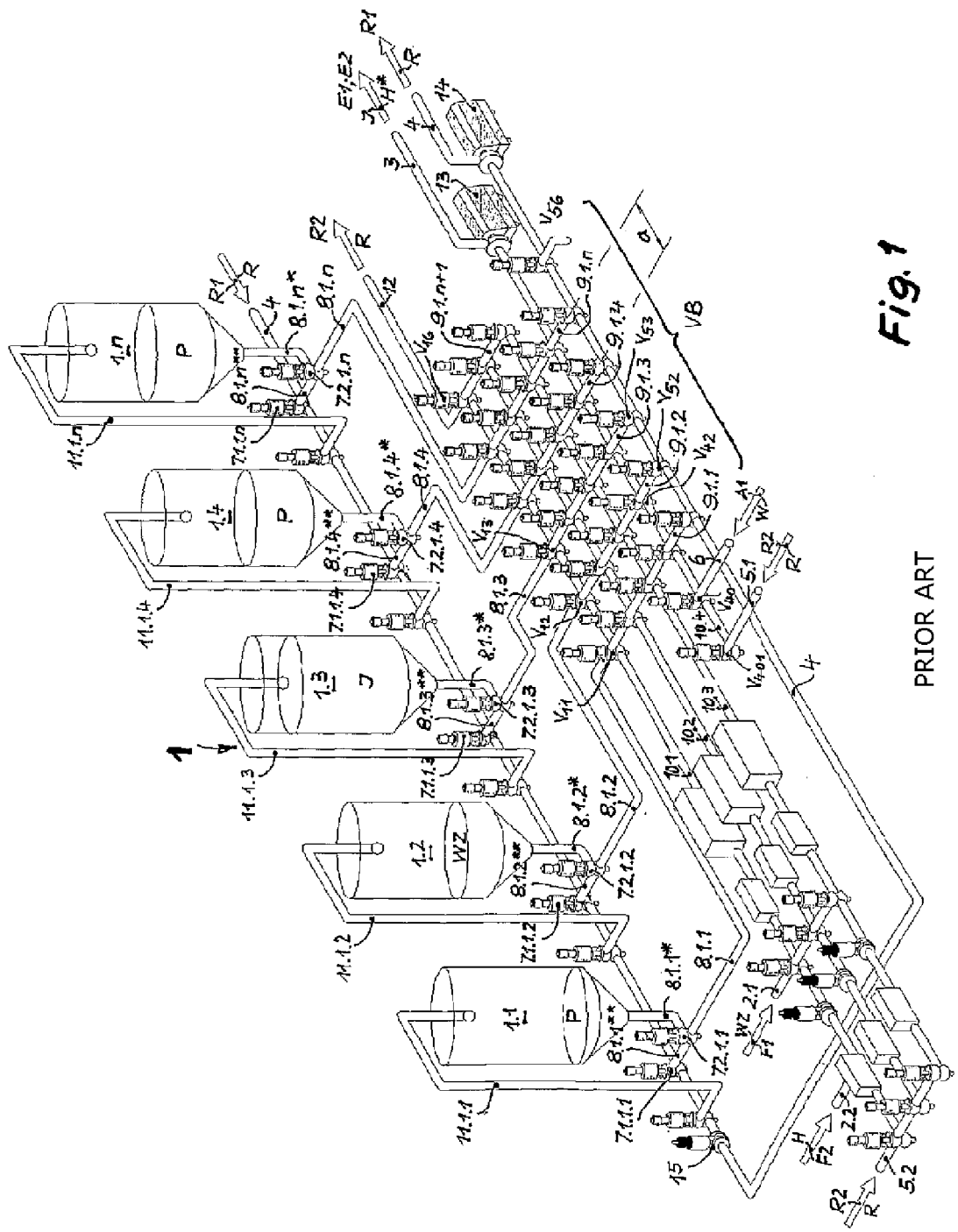
FIG. 1 is a prior art tank farm system.

FIG. 1 (Background Art)

1 Tank farm system
1.1 to 1.n Tank
1.i One of tanks 1.1 to 1.n
2.1 First filling pipe line
2.2 Second filling pipe line
3 Discharging pipe line
4 Cleaning pipe line
5.1 First pipe cleaning feed line
5.2 Second pipe cleaning feed line
6 Expulsion pipe line
7.1.1.1 to 7.1.1.1 First valve
7.2.1.1 to 7.2.1.1n Second valve
8.1.1 to 8.1.n Discharge line
8.1.1* to 8.1.n* Tank discharge line
8.1.1 to 8.1.n Portion of discharge line
9.1.1 to 9.1.n+1 Traverse
10.1 First line
10.2 Second line
10.3 Third line
10.4 Fourth line
11.1.1 to 11.1.n Tank cleaning feed line
12 Pipe cleaning discharge line
13 First pump
14 Second pump
15 Lock-up valve
a Traverse spacing
A1 Expulsion device
E1, E2 Emptying 1 (new beer J), emptying 2 (yeast expulsion H*)
F1, F2 Filling 1 (wort WZ), filling 2 (yeast H)
H Yeast
H* Yeast expulsion
J New beer
P Product in general
R Cleansing agent
R1 Tank cleaning/Pipe cleaning
R2 Pipe cleaning
VB Valve block
$V_{11}$ to $V_{56}$ Valves in valve matrix of valve block
$V_{40}$ First valve associated with valve matrix
$V_{401}$ Second valve associated with valve matrix
W Expulsion water
WZ Wort FIGS. 2 to 6 (Designations in Addition to Those of FIG. 1)

1.1a to 1.na Tank bottom
1.i.a One of tank bottoms 1.1a to 1.na
2.1, 2.2, . . . , 2.n First set of pipe lines (Filling F; Emptying E)
2.i One of pipe lines from first set
3.1, 3.2, . . . , 3.n Second set of pipe lines (Filling F; Emptying E)
3.i One of pipe lines from second set
3.1 First emptying pipe line
3.2 Second emptying pipe line
6.1 First expulsion pipe line
6.2 Second expulsion pipe line
6.3 Third expulsion pipe line
6.4 Fourth expulsion pipe line
12.1 End portion of tank cleaning discharge line 16 Third pump
17 Connection aperture
18 Closing member
19 Closure element with internal passage
20 First sealing point
21 Second sealing point
22 Leakage cavity
23 Leakage discharge line
24 Tank outlet
A1 to A4 Expulsion device
AV Valve assembly for expulsion of pipe lines
B1 to Bn Valve manifold tree
Bi One of manifold trees B1 to Bn
B1$a$ to Bn$a$ Hollow body
Bia Hollow body B1$a$ to Bn$a$ associated with tank 1.i
E Emptying in general
F Filling in general
$V_C$ Double-action sealing valve
$V_{C1.1.1}$ to $V_{C1.n.1}$ Double-action sealing valve in pipe line 3.2
$V_{C1.1.2}$ to $V_{C1.n.2}$ Double-action sealing valve in pipe line 2.1
$V_{C1.1.2}$ to $V_{C1.n.3}$ Double-action sealing valve in pipe line 3.1
$V_{C1.1.2}$ to $V_{C1.n.4}$ Double-action sealing valve in pipe line 4
$V_R$ Double seat valve, first type
$V_{R*}$ Double seat valve, second type
$V_S$ Disc valve
$V_{D2}$ Double seat valve having two casing connections
$V_3$ Lock-up valve having three casing connections
$V_{D3}$ Double seat valve having three casing connections
$V_{D4}$ Double seat valve having four casing connections The above Examples and disclosure are intended to be illustrative and not exhaustive. These examples and description will suggest many variations and alternatives to one of ordinary skill in this art. All these alternative and variations are intended to be included within the scope of the attached claims. Those familiar with the art may recognize other equivalents to the specific embodiments described herein which equivalents are also intended to be encompassed by the claims attached hereto.

The invention claimed is:

1. A method for operating tank farm system having a fixed piped interconnection with a piping system for liquids wherein:
   the tank farm system comprises one or more tanks in fluidic communication with the piping system,
   one or more liquids are fed from at least two pipe lines of the piping system into the one or more tanks
   one or more liquids are discharged from the one or more tanks into at least one pipe line of the piping system
   the one or more liquids are both discharged from and fed to the the one or more tanks through an aperture located at the bottom of the one or more tanks,
   the liquids being fed or discharged flow through a hollow body in fluidic communication with a tank and which is positioned below the aperture at the bottom of the tank, and
   any liquid in said hollow body is optionally and switchably separable in a mix-proof manner from any of the pipe lines of said piping system.

2. A device for managing fluids in a tank farm system having a fixed piped interconnection with a piping system comprising:
   at least one tank
   at least one piping system comprising at least two pipe lines,
   at least one valve manifold tree in fluidic communication with an opening located at the bottom of the at least one tank and having at least one valve, wherein:
   the valve manifold tree comprises an interior defining an elongate hollow body that is oriented to be substantially perpendicular to at least one pipe line,
   the valve manifold tree has at least two connection apertures joining its hollow interior to at least two of the at least two pipe lines,
   and the at least one valve of the valve manifold tree is constructed and arranged to be optionally mix-proof with regards to any contents of the pipe lines and the associated connection apertures, and
   at least one valve of the valve manifold tree switches which if any of the at least two pipe lines are in free fluidic communication with the hollow body.

3. The device according to claim 2, characterized in that the hollow body is disposed at the lowest point of the respective tank bottom.

4. The device according to claim 3, characterized in that the hollow body has a longitudinal axis which is disposed coaxially with a longitudinal axis of the tank.

5. The device according to claim 2, characterized in that the hollow body is formed as a cylindrical tube.

6. The device according to claim 2, characterized in that the lowermost end of the hollow body that faces away from the tank bottom is joined to a pipe line cleaning device.

7. The device according to claim 2, characterized in that a first set of pipe lines and a second set of pipe lines are arranged in pairs each pair in a row-shaped relationship each amongst each other, on opposed sides of the hollow body, in two planes parallel to each other and to the longitudinal axis of the hollow body and are led along said body.

8. The device according to claim 6, characterized in that the piping system further comprises a first set of pipe lines and a second set of pipe lines the first and second set of pipe lines are arranged in pairs each amongst each other, on opposed sides of the hollow body, in two planes parallel to each other and to the longitudinal axis of the hollow body and, while crossing each other at an angle of 90 degrees, are led past the hollow body.

9. The device according to claim 8, characterized in that said pipe lines are constructed and arranged in sealable fluidic communication with every tank of a tank farm system and performs the same function for every tank said function being one selected from the list consisting of: filling the tank, emptying the tank, cleaning the tank, and any combination thereof.

10. The device according to claim 9, characterized in that there are at least two tanks wherein said tanks are in one arrangement selected from the list consisting of: a row-shaped arrangement and a matrix-shaped arrangement.

11. The device according to claim 2, characterized in that at least one valve is formed as a double seat valve with two closing members movable with respect to each other that define a leakage cavity between themselves which is joined to the area surrounding the double seat valve via at least one communication path.

12. The device according to claim 2, characterized in that at least one valve is formed as a double seat valve with a slide valve like closing member and a slide valve like closure element having an inside passage which are formed to be movable with respect to each other, that said closing member and said closure element, each in communication with the valve casing, form two sealing points which are disposed serially and in planes parallel to each other, including a leakage cavity which is disposed on the valve casing end, is joined to the area surrounding the valve, on one hand, and opens into an interior of the valve between the sealing points, on the other, that when the valve is in its closing position the leakage cavity is closed with respect to the interior of the valve by the closing member interacting with the two sealing points, and that the entry of media into the leakage cavity from the interior, in positions other than the closing position of the valve, is controlled in its action in the same way as in the closing position by the closure element having an inside passage that acts as a substitute of the closing member with regard to its interaction with the leakage cavity.

13. The device according to claim 2, characterized in that at least one valve is formed as a double-action sealing valve with two seat sealings spaced apart on a closing member in the direction of lift between which an annularly circumferential leakage cavity is disposed which is joined to the area surrounding the double-action sealing valve via at least one communication path.

14. The device according to claim 2, characterized in that the at least one valve is subjected to a seat cleaning procedure by partial lifting motions of its one or more closing members.

15. The device according to claim 2, characterized in that said valve is formed as a disc valve with a disk shaped closing member and with two seals spaced apart at a sealing circumference of the disc-shaped closing member between which an annularly circumferential leakage cavity is disposed which is joined to the area surrounding the disc valve via at least one communication path.

16. The device according to claim 2, characterized in that a valve assembly is provided at each near-the-tank end of the pipe line for expulsion from the pipe lines.

* * * * *